US008002981B2

(12) United States Patent
Bagci et al.

(10) Patent No.: US 8,002,981 B2
(45) Date of Patent: Aug. 23, 2011

(54) FUEL FILTER ASSEMBLY WITH FLOW RESTRICTION SLEEVE

(75) Inventors: Ismail Bagci, Cookeville, TN (US);
Chad Brummitt, Algood, TN (US);
Abby True-Dahl, Sparta, TN (US);
Wassem Abdalla, Cookeville, TN (US);
Yiming Zhang, Cookeville, TN (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 920 days.

(21) Appl. No.: 11/935,619

(22) Filed: Nov. 6, 2007

(65) Prior Publication Data
US 2009/0114588 A1   May 7, 2009

(51) Int. Cl.
*B01D 35/30* (2006.01)
(52) U.S. Cl. ............ 210/232; 55/410; 55/490; 210/235; 210/429; 210/437; 210/438; 210/450
(58) Field of Classification Search .................. 210/232, 210/234, 235, 429, 430, 435, 437, 438, 450, 210/418, 424, 451; 123/198 D; 55/410, 55/490
See application file for complete search history.

(56) References Cited

U.S. PATENT DOCUMENTS

| | | | | |
|---|---|---|---|---|
| 1,940,316 | A * | 12/1933 | McKinley | 210/437 |
| 3,724,665 | A * | 4/1973 | Hall | 210/130 |
| 5,362,390 | A | 11/1994 | Widenhoefer et al. | |
| 5,458,767 | A * | 10/1995 | Stone | 210/90 |
| 5,770,065 | A * | 6/1998 | Popoff et al. | 210/232 |
| 5,846,417 | A | 12/1998 | Jiang et al. | |
| 6,053,334 | A | 4/2000 | Popoff et al. | |
| 6,113,781 | A | 9/2000 | Popoff et al. | |
| 6,171,491 | B1 | 1/2001 | Popoff et al. | |
| 6,495,042 | B1 * | 12/2002 | Knight | 210/497.01 |
| 6,884,349 | B1 | 4/2005 | Jiang | |
| 7,543,711 | B1 * | 6/2009 | Stamey et al. | 210/435 |
| 7,854,839 | B2 * | 12/2010 | Abdalla et al. | 210/232 |
| 2001/0004061 | A1 * | 6/2001 | Popoff et al. | 210/235 |
| 2007/0084432 | A1 * | 4/2007 | Jensen et al. | 123/198 D |
| 2007/0241047 | A1 * | 10/2007 | Roll et al. | 210/437 |
| 2009/0065447 | A1 * | 3/2009 | Forrest et al. | 210/767 |

OTHER PUBLICATIONS

International Search Report of PCT/US2008/072884, dated Dec. 30, 2008.
Written Opinion of the International Searching Authority of PCT/US2008/072884, dated Dec. 30, 2008.

* cited by examiner

*Primary Examiner* — Joseph W Drodge
(74) *Attorney, Agent, or Firm* — Hamre, Schumann, Mueller & Larson, P.C.; J. Bruce Schelkopf

(57) ABSTRACT

A "no filter, no run" filtration system that is designed to verify that an appropriate filter cartridge is installed. A flow control sleeve is provided on a standpipe to control the flow of fluid, for example fuel, into the standpipe. The sleeve can be axially moveable between closed and open positions, with one or more members on an installed filter cartridge designed to release the sleeve to permit the movement from the closed position to the open position to allow fluid flow. A spring acts on the sleeve to bias the sleeve back to the closed position upon removal of the filter cartridge. The sleeve can also be designed without axial movement, but nonetheless is configured to be opened and closed to control fluid flow into the standpipe.

21 Claims, 9 Drawing Sheets

FUEL FILTER ASSEMBLY WITH FLOW RESTRICTION SLEEVE

FIELD

This disclosure generally pertains to the field of filtration, and more particularly to fuel filtration systems designed to safe-guard against damage to fuel injectors, associated fuel components, and engine malfunctions resulting from a missing or incorrect fuel filter.

BACKGROUND

Fuel filtration systems are known that are designed to prevent flow of fuel to an engine if no filter cartridge is installed or in the incorrect filter cartridge is installed. In these "no filter, no run" systems, not only must a filter cartridge be present, but the correct filter cartridge must be used, in order to allow fuel to flow to the engine.

In some fuel filtration systems that use a filter cartridge, whether in a "no filter, no run" system or not, removal and servicing of the filter cartridge can be difficult. Therefore, a fuel filtration system that enhances filter cartridge removal and servicing would be beneficial.

SUMMARY

A "no filter, no run" filtration system that is designed to verify that a filter cartridge is present to safe-guard against damage to fuel injectors, associated fuel components, etc. and engine malfunctions. Fuel flow to the engine is substantially prevented if a filter cartridge is not installed, and an appropriately designed filter cartridge is required to be used in order to permit sufficient fuel flow.

A flow control sleeve is provided on a standpipe to control the flow of fuel into the standpipe. The sleeve can be axially moveable between closed and open positions, with one or more members on an installed filter cartridge designed to release the sleeve to permit the movement from the closed position to the open position to allow fuel flow. A spring acts on the sleeve to bias the sleeve back to the closed position upon removal of the filter cartridge. The bias of the spring also creates a positive force that acts on the filter cartridge in the removal direction through the sleeve thus facilitating a more effortless cartridge removal. The sleeve can also be designed without axial movement, but nonetheless is configured to be opened and closed to control fuel flow into the standpipe.

In one embodiment, a filter housing includes a standpipe and a flow control sleeve surrounds at least a portion of the standpipe. The sleeve includes at least one opening through the sleeve, and the sleeve is slideably disposed on the standpipe for movement between a first position where the sleeve covers the standpipe opening and a second position where the sleeve opening is at least partially aligned with the standpipe opening. When the standpipe opening is covered, fuel is substantially prevented from flowing into and through the standpipe, thereby preventing engine operation. When the sleeve opening and the standpipe opening align, fuel can flow into and through the standpipe and ultimately to the engine. To actuate the sleeve to the second position, an appropriately designed filter cartridge must be installed in the filter housing.

In another embodiment, a filter housing includes a standpipe with a standpipe opening and a sleeve surrounds at least a portion of the standpipe including the standpipe opening. The sleeve includes a plurality of resilient fingers that are deflectable from a first position to a second position. The standpipe opening is covered when the fingers are in the first position to prevent flow through the standpipe and the standpipe opening is not covered when the fingers are at the second position to permit flow through the standpipe.

The fingers can close and open the standpipe opening without axial movement of the sleeve, in which case deflection of the fingers to the second position uncovers the standpipe opening sufficiently to allow fuel to flow through gaps created between the fingers and into the standpipe opening. Alternatively, the sleeve can be designed to move axially to control flow through the standpipe opening, with the deflection of the fingers controlling axial movement of the sleeve.

The fingers are deflected by one or more protrusions on a filter cartridge that is installed. In one embodiment, the protrusions can remain engaged with the fingers at the second position and retain the fingers under load at the second position when the standpipe opening is not covered. In another embodiment, a tapered recess, slot or groove can be incorporated on the standpipe to unload the fingers until the cartridge is removed and the bias spring resets the sleeve.

When the sleeve is designed to move axially, a spring can be provided that biases the sleeve to a closed position. Since the sleeve is engaged with the filter cartridge, the spring also facilitates removal of the filter cartridge by applying a bias to the filter cartridge to lift the cartridge upward in a cartridge removal direction. This facilitates removal of the cartridge from the filter housing.

In certain designs, the flow control sleeve can be designed to permit a certain amount of fuel flow past the sleeve and into the standpipe. The amount of fuel flow permitted when the sleeve is closed should be insufficient to operate the engine. In some designs, the sleeve can be manufactured to less exacting tolerances since it need not completely shut off fuel flow, thereby reducing the cost of manufacture of the sleeve. In other designs, the sleeve and/or standpipe can be manufactured with features to permit flow. Nonetheless, the amount of fuel flow permitted when the sleeve is closed is low enough that engine operation is prevented.

DETAILED DESCRIPTION

Figure 1:
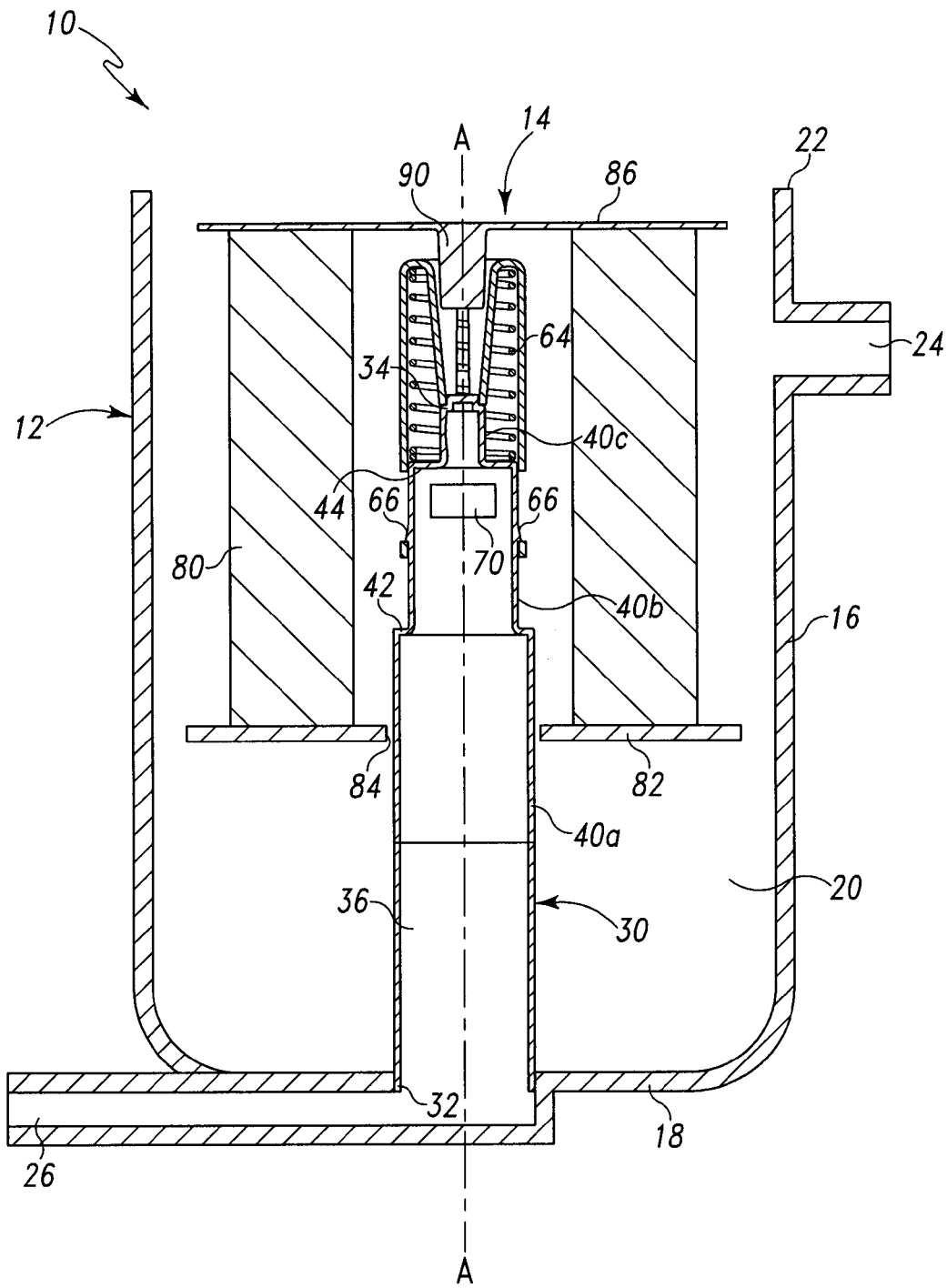
FIG. 1 is a side sectional view of a filter assembly that includes a filter cartridge and a filter housing.

FIG. 1 illustrates a filter assembly 10, for example a fuel filter assembly, which is intended to filter a fluid, for example fuel, prior to the fluid reaching an engine. The assembly 10 includes a filter housing 12 that is designed to receive a filter cartridge 14 therein for filtering the fluid. The description will hereinafter refer to the filter assembly 10 as being a fuel filter assembly, and that the fluid being filtered is fuel. However, in appropriate circumstances, the concepts described herein can be applied to other types of filter assemblies that filter other types of fluids.

The filter housing 12 includes a housing body that has a side wall 16 and an end wall 18. The side wall 16 and the end wall 18 define a filter cartridge space 20 that is large enough to receive the filter cartridge 14 therein, with the end wall 18 forming a closed end of the space 20. The housing body has an open end 22 generally opposite the end wall 18, with the open end 22 in use being closed by a cap (not shown) that closes off the space 20. The housing body also includes an inlet opening 24, illustrated in FIG. 1 as extending through the side wall 16, through which fuel to be filtered enters the space 20, and an outlet 26, illustrated as extending from the end wall 18 through which fuel exits on its way to the engine. It is to be realized that the filter housing 12 could have other configurations than that described herein.

A standpipe 30 is secured to the end wall 18 and extends upwardly into the space 20 toward the open end 22. In the illustrated embodiment, the standpipe 30 is generally hollow from its end 32 connected to the end wall 18 to a tip end 34 thereof, thereby defining an internal flow passage 36. The flow passage 36 is in communication with the outlet 26 so that fuel that enters the standpipe 30 can flow from the standpipe and into the outlet 26 to the engine. The standpipe 30 is disposed generally centrally in the housing 12, with a central axis A-A of the standpipe 30 generally coaxial with a central axis of the space 20.

In the embodiment illustrated in FIG. 1, the standpipe 30 is generally cylindrical and the passage 36 is generally circular along its length when the standpipe 30 is viewed in a cross-section taken perpendicular to the axis A-A. However, the standpipe 30 and the passage 36 could have other configurations, such as non-cylindrical and non-circular. For example, the passage 36 could be oval in cross-section.

The standpipe 30 is stepped in diameter to define different diameter sections 40a, 40b, 40c. The section 40a extends from the end wall 18 for the majority of the length of the standpipe 30. The section 40b, which has a smaller diameter than the section 40a, extends upwardly from the section 40a. A shoulder 42 is defined at the juncture of the sections 40a, 40b. The section 40c, which has a smaller diameter than the section 40b, extends upwardly from the section 40b and includes the tip end 34. A shoulder 44 is defined at the juncture of the sections 40b, 40c.

Figure 2:
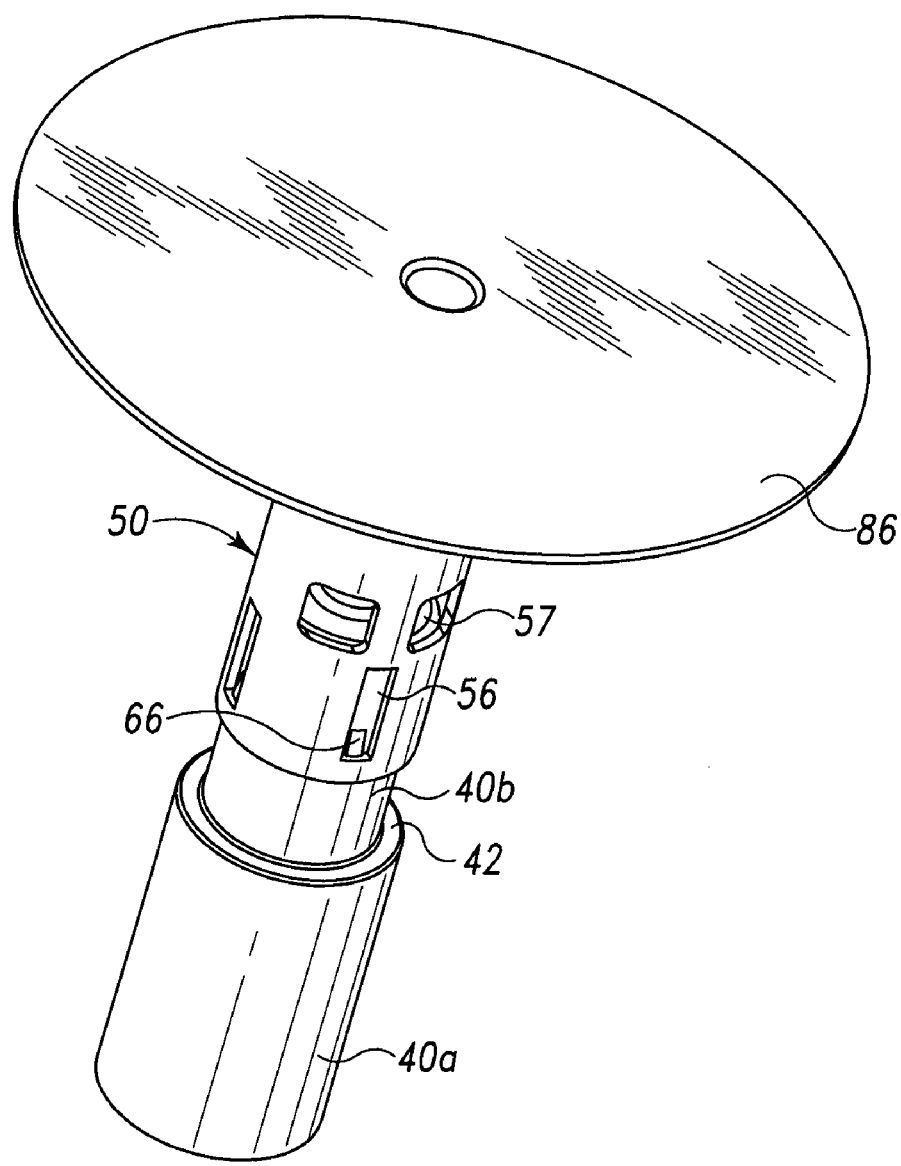
FIG. 2 is a perspective view of the flow control sleeve on the standpipe.

A flow control sleeve 50 is slideably disposed on the standpipe 30 adjacent the tip end 34. With reference to FIGS. 2-5, the sleeve 50 comprises a generally circular body 52 having a first section 54 with one or more slots 56 extending through the body 52 and a second section 55 with one or more flow openings 57. As shown in FIG. 2, the openings 57 are positioned at circumferential locations on the sleeve 50 between the slots 56. The sleeve 50 is made of a material suitable for exposure to fuel or other type of fluid flowing through the assembly 10. For example, the sleeve 50 can be made of plastic or metal.

Figure 3:
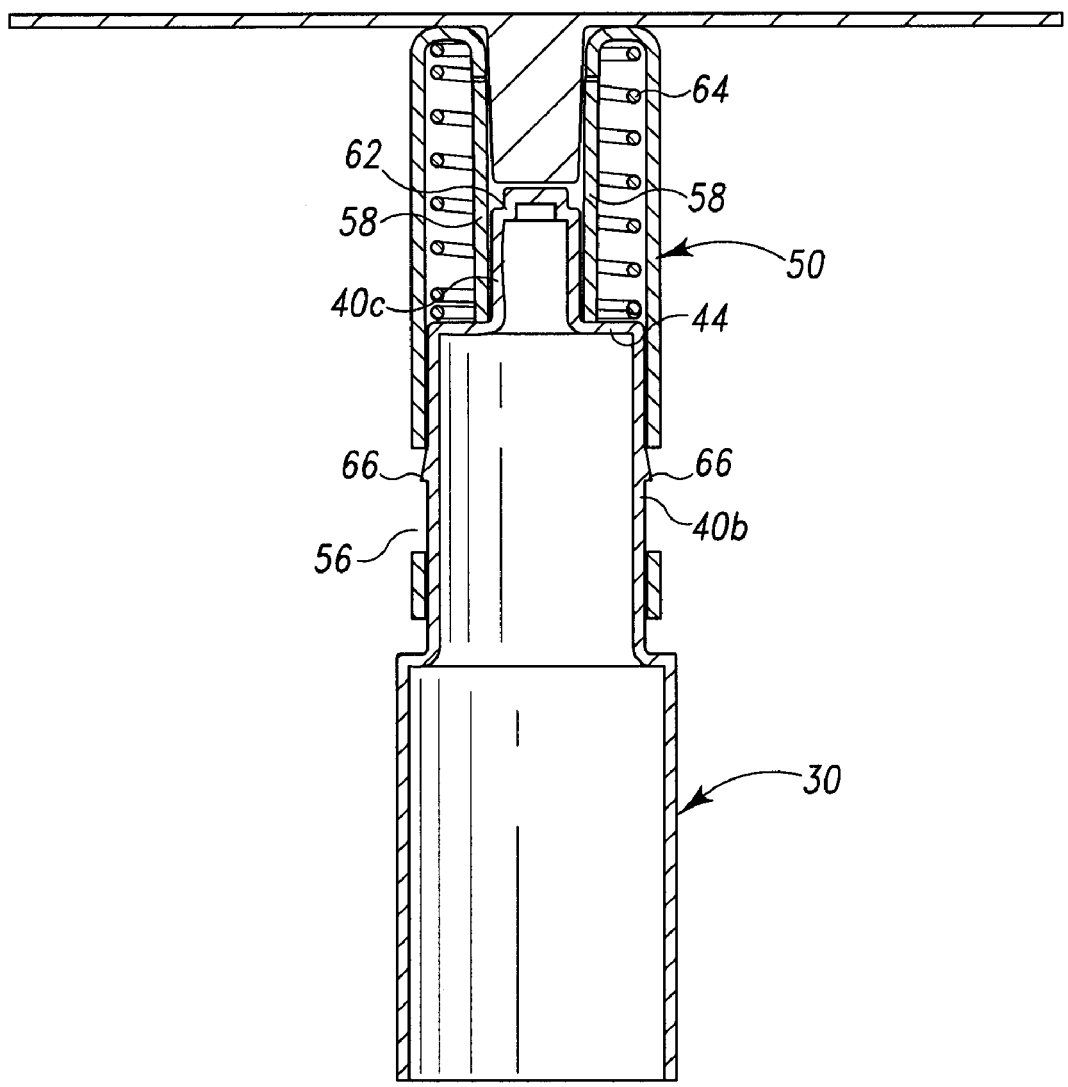
FIG. 3 shows the flow control sleeve in FIG. 1 actuated to an open position.
Figure 4:
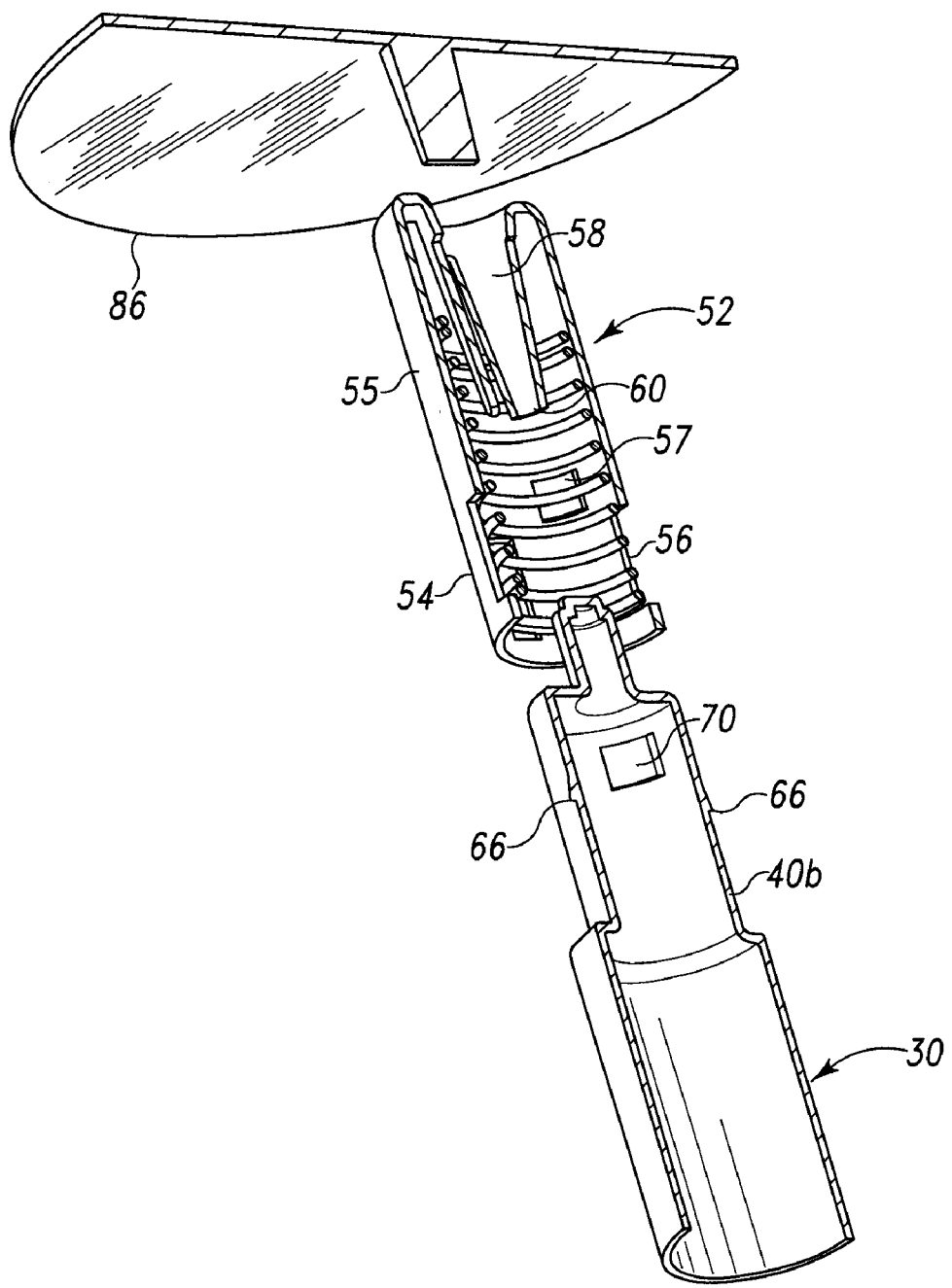
FIGS. 4 and 5 are exploded views of the flow control sleeve and the end of the standpipe of FIGS. 1-3.
Figure 5:
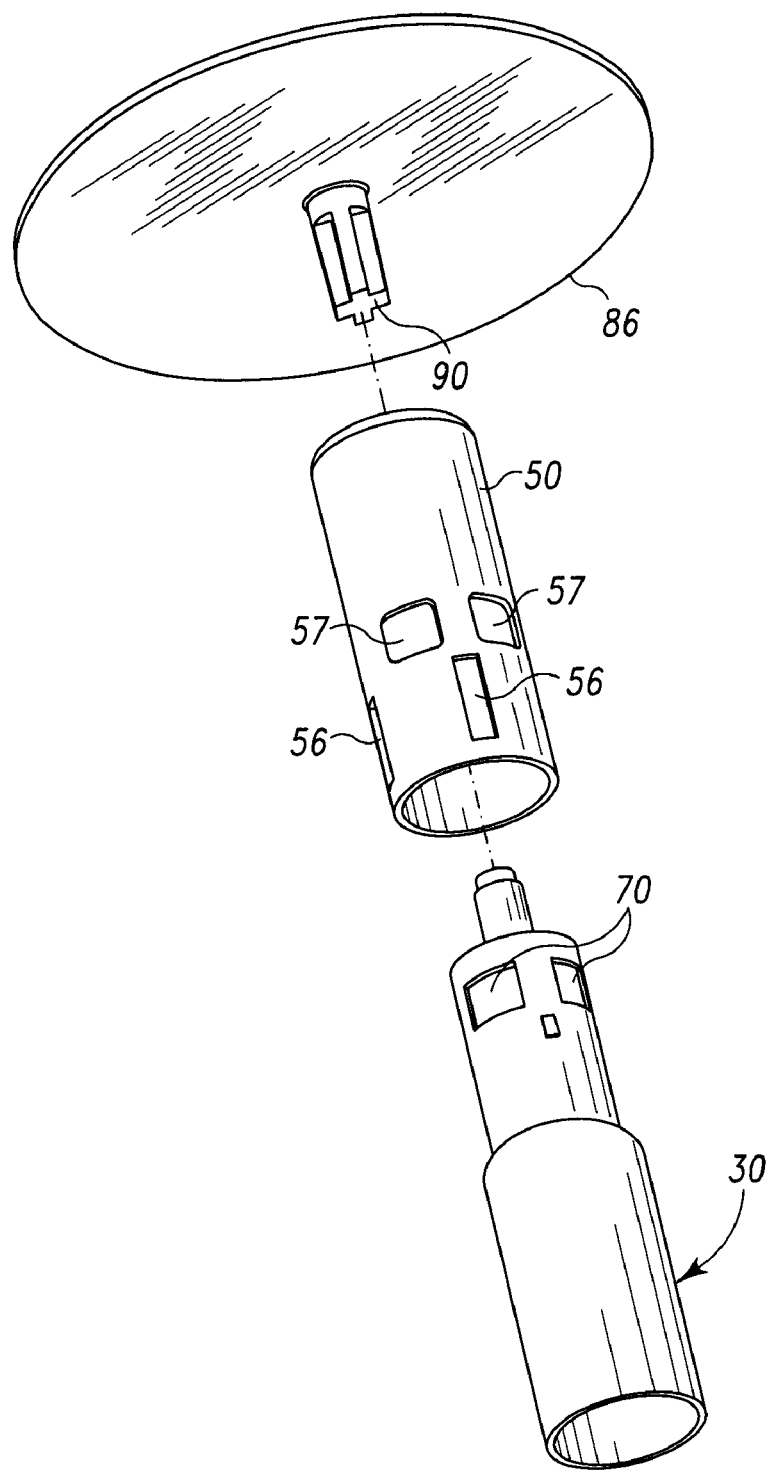

A plurality of resilient fingers 58 are secured to the upper section 54 and extend into the body 52. The fingers 58 are integrally formed with the body 52, and are thus made of the same material as the body 52. The fingers 58 extend from their point of attachment to the body 52 downward into the interior of the body spaced from the interior surface of the body 52. As shown in FIG. 3, the fingers 58 decrease in width (i.e. taper) as they extend from their attachment point to the body 52 to unattached, distal ends 60 which are spaced from the distal ends of adjacent fingers 58. As shown in FIG. 1, the fingers 58 also normally angle toward each other and the central axis A-A, with the distal ends 60 defining an opening.

Due to their construction, the ends 60 of the fingers 58 are resilient and can be deflected generally radially outward to the position shown in FIG. 3 upon application of a suitable force to actuation surfaces thereof that face generally inwardly toward the central axis A-A. Upon removal of that force, the fingers 58 automatically return to their position shown in FIG. 1.

With reference to FIGS. 1 and 3, the section 40c of the standpipe 30 includes a circular support shoulder 62 at the tip end 34 on which the distal ends 60 are received at the closed position of the sleeve 50. A coil spring 64 extends between the shoulder 44 and the interior of the sleeve 50 where the fingers 58 connect to the body 52. The spring 64 biases the sleeve 50 in a direction away from the end wall 18, i.e. in a direction opposite an insertion direction of the filter cartridge into the housing. Small protrusions 66 on the outside of the standpipe 30 engage within the slots 56 in the sleeve 50 to limit axial movement of the sleeve toward and away from the end wall 18 as well as limiting rotational movement of the sleeve 50.

One or more openings 70 are formed in the section 40b of the standpipe 30 to place the exterior of the standpipe in communication with the passage 36. In the illustrated embodiment, the number of openings 70 corresponds to the number of openings 57 formed in the sleeve 50. However, a larger or smaller number of openings 70 can be provided. The openings 70 are positioned at circumferential positions that correspond to the openings 57, without overlapping the slots 56. Therefore, fluid is prevented from flowing through the slots 56 and into the openings 70.

The sleeve 50 is configured such that at the closed position shown in FIG. 1, the first section 54 of the sleeve covers the openings 70, to thereby prevent fuel from entering into the standpipe 30. Upon movement of the sleeve to the open position shown in FIG. 3, the openings 57 in the sleeve align with the openings 70 to permit fuel to flow into the standpipe.

Movement of the sleeve 50 to the open position occurs as a result of installing the correct filter cartridge 14. Returning to FIG. 1, the cartridge 14 includes a ring of filter media 80 suitable for filtering fuel. The outside of the filter media 80 defines a dirty or unfiltered fuel side while inside the ring of media 80 is a clean or filtered fuel side. Thus, the filter cartridge is configured for outside-in flow.

A first end cap or plate 82 is secured to the bottom end of the media 80 for generally closing the bottom end of the media. The plate 82 includes an opening 84 therethrough through which the standpipe is inserted upon installation of the filter cartridge. A seal (not shown) will typically be provided on the plate 82 to seal with the standpipe 30 to prevent leakage of clean fuel past the plate 82. A second end cap or plate 86 is secured to the opposite end of the media 80 for closing off the opposite end of the media.

In the illustrated embodiment, the plate 86 is generally flat and planar. Except that the plate 86 includes a projection 90 that projects along the axis A-A downwardly into the interior space of the media 80. The projection 90 is designed to actuate the fingers 58 and deflect them radially to release the fingers from the shoulder 62 and permit axial movement of the sleeve. The projection 90 is wider than the section 40c of the standpipe so that the fingers 58 are deflected outward a sufficient distance to clear the shoulder 62.

As illustrated in FIGS. 1 and 3, the projection 90 is designed to extend into the end of the sleeve 50 and engage the fingers 58 when the filter cartridge 14 is installed. As the projection 90 travels downward, the projection deflects the fingers 58 radially outward, which disengages the ends 60 of the fingers from the shoulder 62. This permits the weight of the filter cartridge 14 acting on the top end of the sleeve 50 and the force from the person installing the filter cartridge 14 to force the sleeve 50 downward until the ends 60 of the fingers engage the shoulder 44. At this position, the openings 57 will be aligned with the openings 70 to permit fuel to enter into the standpipe.

In the illustrated embodiment, when the sleeve 50 is open, the projection 90 remains in contact with the fingers 58 and keeps the fingers 58 under load. In an alternative embodiment, a tapered recess, slot or groove can be provided on the standpipe 30 to unload the fingers 58 when the sleeve 50 is open. The recess, slot or groove would allow release of the fingers therefrom when the cartridge is removed and the bias spring 64 resets the sleeve 50.

Upon removal of the filter cartridge 14, the spring 64 will bias the sleeve 50 upward to the position shown in FIG. 1, thereby preventing fuel flow into the standpipe until the correct filter cartridge with a protrusion that can release the fingers is installed. If a standard filter cartridge without a suitable protrusion is installed, the sleeve will not slide down the standpipe, and the filter cartridge will project upward from the housing 12 and prevent installation of the housing cover. This will act as a sign that the incorrect filter cartridge has been installed.

Figure 6:
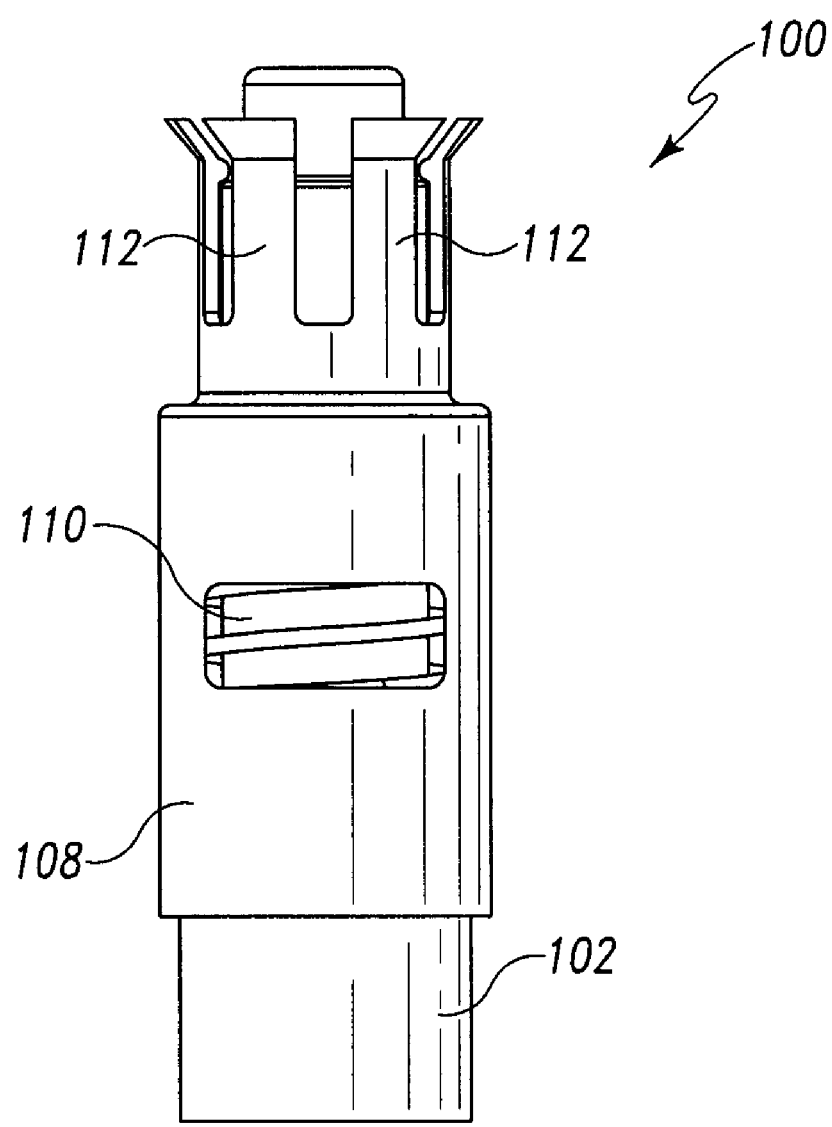
FIGS. 6-8 illustrate an alternative embodiment of a flow control sleeve, with FIG. 6 being a side view and FIGS. 7-8 being cross-sectional views.
Figure 7:
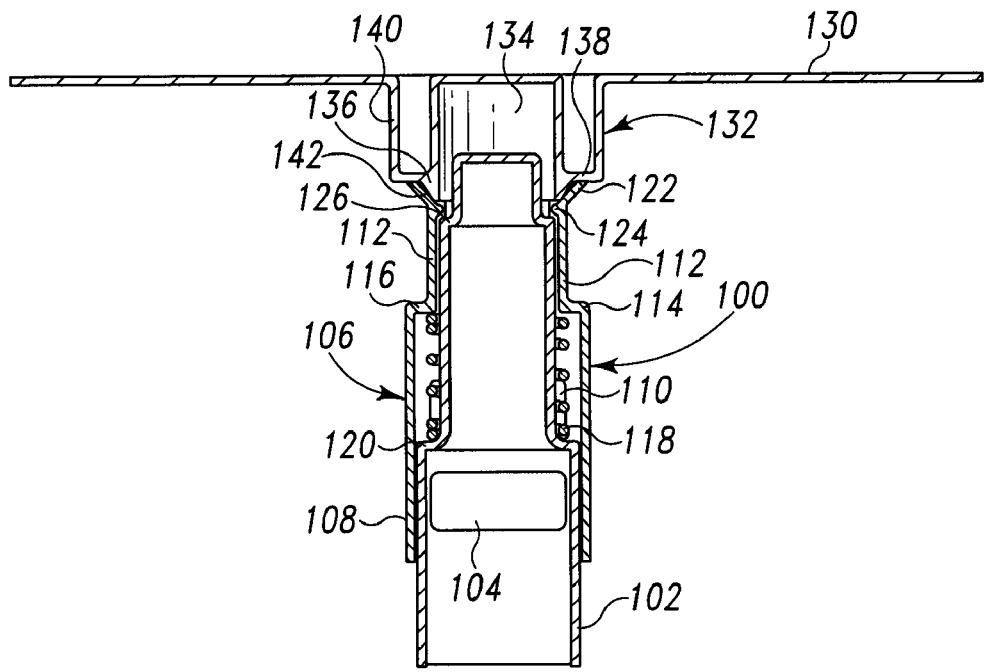
Figure 8:
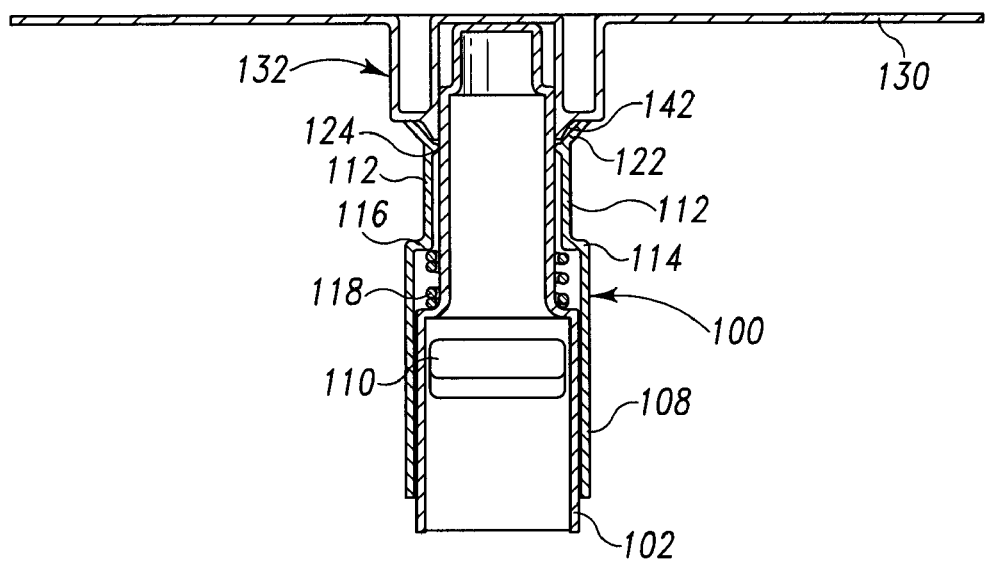

With reference to FIGS. 6-8, an alternative embodiment of a flow control sleeve 100 is illustrated. The sleeve 100 is slideably disposed on a standpipe 102 that includes an opening 104 into the interior of the standpipe.

The sleeve 100 includes a generally circular body with a solid section 108 and an upper section with one or more openings 110 extending through the body 106. A plurality of resilient fingers 112 extend upwardly from an upper end 114 of the body 106, with a shoulder 116 defined between the fingers 112 and the end 114. A coil spring 118 is disposed within the sleeve 100, engaged between the shoulder 116 and a shoulder 120 on the standpipe 102. The spring 118 biases the sleeve 100 upwardly away from an end wall of the housing containing the standpipe to a closed position shown in FIGS. 6 and 7.

The fingers 112 comprise a plurality of fingers disposed at spaced locations around the sleeve 100. Upper ends 122 of the fingers flare outwardly, and each finger 112 includes a protrusion 124 projecting inwardly at the base of the flared end 122. The protrusions 124 engage with a shoulder 126 defined on the standpipe 102 to prevent downward axial sliding movement of the sleeve 100 and retain the sleeve at a closed position. At the closed position, the solid section 108 covers the standpipe opening 104 to prevent fuel flow into the standpipe.

However, the fingers 112 are deflectable generally outward in a radial direction as a result of a force being applied to the flared ends 122. When deflected outward, the engagement between the protrusions 124 and the shoulder 126 is released, allowing the sleeve to slide axially downward to an open position as shown in FIG. 8. In the open position, the opening 110 in the sleeve aligns with the standpipe opening 104 to permit fuel flow into the standpipe.

Deflection of the fingers 112 is caused by suitable structure on an upper end plate 130 of a filter cartridge when the filter cartridge is installed. Only the end plate 130 of the filter cartridge is illustrated in FIGS. 7 and 8, the remainder of the filter cartridge not being important to describing the operation of the sleeve 100. The end plate 130 includes a circular protrusion 132 that projects downwardly therefrom. The protrusion 132 includes a central recess 134 that receives the end of the standpipe when the cartridge is installed, a projecting rim 136 surrounding the recess 134, a radial surface 138, and an axial surface 140. The rim 136 includes an angled surface 142 that extends from the radial surface 138.

With reference to FIG. 7, when the filter cartridge is installed, the angled surface 142 of the protrusion 132 engages the flared ends 122 of the fingers 112, which causes the ends of the fingers 112 to deflect outwardly. This deflection releases the protrusions 124 and the shoulder 126, thereby permitting the sleeve 100 to slide downward. As shown in FIG. 8, the sleeve 100 is pushed downward against the bias of the spring 118, eventually reaching the point where the openings 104, 110 are aligned.

When the sleeve 100 is open, the protrusion 132 remains in contact with the fingers 112 and keeps the fingers 112 under load. However, a tapered recess, slot or groove can be provided on the standpipe that receives the protrusions 124 to unload the fingers 112 when the sleeve 100 is open.

Upon removal of the filter cartridge, the spring 118 will bias the sleeve 100 upward to the position shown in FIG. 7, thereby preventing fuel flow into the standpipe until the correct filter cartridge with a protrusion that can release the fingers is installed. If a standard filter cartridge without a suitable protrusion is installed, the sleeve will not slide down the standpipe, and the filter cartridge will project upward from the filter housing and prevent installation of the housing cover. This will act as a sign that the incorrect filter cartridge has been installed.

Figure 10:
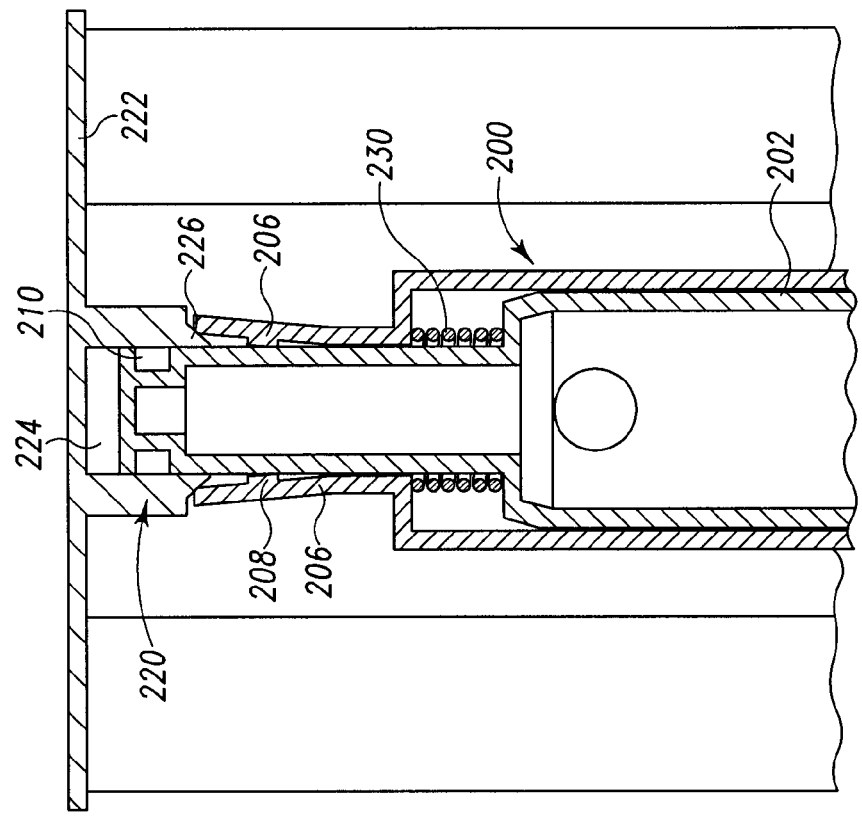
FIGS. 9 and 10 illustrate yet another alternative embodiment of a flow control sleeve.
Figure 9:
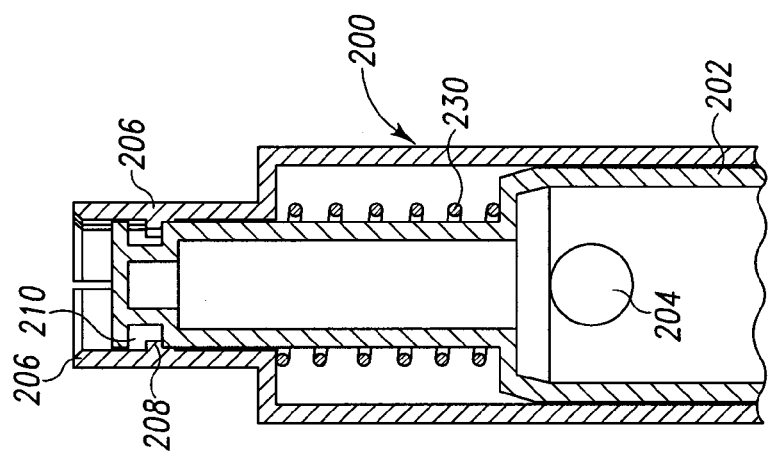

Another alternative embodiment of a flow control sleeve 200 is illustrated in FIGS. 9 and 10. The sleeve 200 is slideably disposed on a standpipe 202 that includes an opening 204 into the interior of the standpipe. In this embodiment, the sleeve 200 includes resilient, deflectable fingers 206 extending upwardly from the end of the sleeve 200. The fingers 206 include protrusions 208 that engage within a recess or recesses 210 in the outside surface of the standpipe to retain the sleeve 200 at a closed position where the sleeve 200 prevents fuel flow into the standpipe opening 204. The fingers 206 must be deflected outwardly to release the engagement between the protrusions 208 and the recess 210 to allow the sleeve 200 to slide downward in an axial direction.

Deflection of the fingers 206 is caused by a protrusion 220 formed on an upper end plate 222 of a filter cartridge. The protrusion 220 includes a central recess 224 that receives the end of the standpipe and a similar rim structure 226 as the rim described in FIGS. 6-8. With reference to FIGS. 9 and 10, when the filter cartridge is installed, the rim structure 226 of the protrusion 220 engages the ends of the fingers 206, deflecting the fingers outwardly to release the protrusions 208 from the recess 210. The sleeve 200 can then slide down to align an opening in the sleeve with the standpipe opening 204.

Upon removal of the filter cartridge, a coil spring 230 biases the sleeve 200 upwardly until the protrusions 208 engage within the recess 210, thereby locking the sleeve at the closed position.

Figure 11:
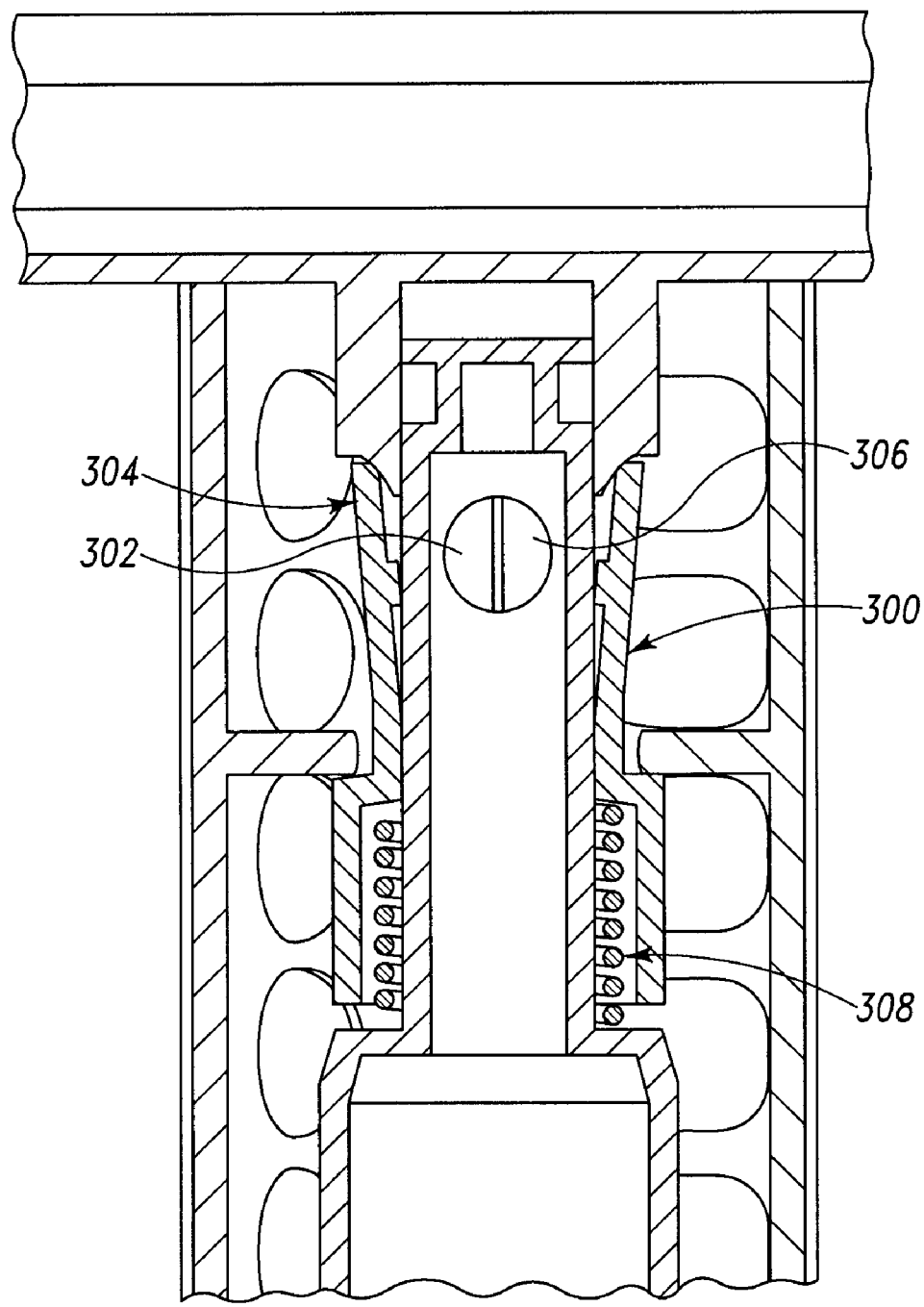
FIG. 11 illustrates yet another embodiment of a flow control sleeve.

FIG. 11 illustrates an embodiment of a sleeve 300 that slides axially and which is similar to the sleeve 200 in FIGS. 9 and 10, but the sleeve does not include an opening that aligns with a standpipe opening 302. Instead, deflection of fingers 304 allows the sleeve to slide downward. Gaps 306 between the fingers 304 permits fuel to flow into the standpipe opening 302 through the gaps 306 between the fingers 304. A coil spring 308 biases the sleeve 300 back to the closed position upon removal of the filter cartridge.

In an embodiment somewhat similar to FIG. 11, a sleeve can be designed without axial movement, but where fingers deflect outwardly to uncover a standpipe opening that is covered by the fingers which are relatively closely spaced together. When the fingers deflect outwardly, gaps created between the fingers allow fuel to flow into the standpipe opening. When the filter cartridge is removed, the fingers deflect back to their closed position covering the standpipe opening to prevent fuel flow into the standpipe. Since the sleeve does not move axially, a biasing spring is not required in this embodiment.

In all of the embodiments described herein, the sleeves have been described as preventing fuel flow into the standpipe when the sleeve is at a closed position. However, it is contemplated that the embodiments described herein could be designed to permit a certain amount of fuel to flow into the standpipe when the sleeve is at the closed position. The amount of fuel permitted to flow when the sleeve is closed should be insufficient to permit engine operation. This permits the sleeves described herein to be manufactured to less exacting tolerances since they would not need to completely shut off fuel flow. This would permit reduction in the cost of manufacture of the sleeve, since it need not fit closely onto the standpipe. Alternatively, the sleeve and/or standpipe can be manufactured with features to permit fuel to flow into the standpipe when the sleeve is closed. For example, grooves or channels could be provided on the sleeve and/or standpipe to permit limited fuel flow when the sleeve is at the closed position. Therefore, the word prevention of fuel flow (or similar) as used herein, unless indicated otherwise, is meant to include complete shut off of fuel, as well as allowing limited flow of fuel as long as the amount of fuel is insufficient to permit engine operation.

The invention may be embodied in other forms without departing from the spirit or novel characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A filter housing comprising:
   a housing body having a side wall and an end wall defining a filter cartridge space, the end wall forming a closed end of the filter cartridge space, and the body having an open end opposite the end wall;
   a standpipe secured to the end wall and extending into the filter cartridge space from the closed end toward the open end, the standpipe including an internal flow passage, and at least one opening in the standpipe that places the internal flow passage in communication with the filter cartridge space; and
   a sleeve surrounding at least a portion of the standpipe, the sleeve including at least one opening through the sleeve, the sleeve is slideably disposed on the standpipe for movement between a first position where the sleeve covers the standpipe opening and a second position where the sleeve opening is at least partially aligned with the standpipe opening,
   the sleeve includes a plurality of resilient fingers that are deflectable radially outward away from a longitudinal axis of the standpipe and from a locked position to an unlocked position; when the resilient fingers are at the locked position, the fingers are engaged with the standpipe to retain the sleeve at the first position; and when the resilient fingers are at the unlocked position, movement of the sleeve to the second position is permitted,
   a filter cartridge having an endplate with a projecting portion,
   each finger has an angled actuation surface that faces generally inward toward a longitudinal axis of the standpipe and generally upward toward the open end of the housing body, the angled actuation surfaces configured to guide the projecting portion of the endplate of the filter cartridge to actuate the fingers from the locked position to the unlocked position.

2. The filter housing of claim 1, further including a spring that biases the sleeve toward the first position.

3. The filter housing of claim 1, wherein the fingers are under load at the unlocked position.

4. The filter housing of claim 1, wherein the standpipe opening is located on the standpipe adjacent a distal end thereof, the distal end is at a position closer to the open end of the housing body than to the end wall of the housing body, and the sleeve surrounds the distal end of the standpipe.

5. The filter housing of claim 1, wherein the sleeve includes a body section and an upper end section coaxial with one another, the upper end section has a smaller diameter than the body section such that an annular shoulder is formed to connect the body section and the upper end section.

6. The filter housing of claim 5, wherein each of the resilient fingers extends upwardly from the upper end section of the sleeve toward the open end of the housing, each of the resilient fingers includes an upper end and a protrusion at a base of the upper end, the upper ends flare outwardly away from the longitudinal axis of the standpipe and define the angled actuation surfaces, the protrusions project inwardly toward the longitudinal axis of the standpipe, and when the sleeve is at the first position the protrusions engage with a shoulder defined on the standpipe.

7. A filter housing comprising:
   a housing body having a side wall and an end wall defining a filter cartridge space, the end wall forming a closed end of the filter cartridge space, and the body having an open end opposite the end wall;
   a standpipe secured to the end wall and extending into the filter cartridge space from the closed end toward the open end, the standpipe including an internal flow passage, and at least one opening in the standpipe adjacent an upper end thereof that places the internal flow passage in communication with the filter cartridge space;
   a filter cartridge having an endplate with a projecting portion; and
   a flow control sleeve disposed adjacent the upper end of the standpipe for controlling flow through the standpipe opening, the flow control sleeve includes a plurality of resilient fingers with angled actuation surfaces that face generally inward toward a longitudinal axis of the standpipe and generally upward toward the open end of the housing body, wherein when the projecting portion of the endplate of the filter cartridge being installed engages with the angled actuation surfaces, the fingers are deflectable radially outward away from the longitudinal axis of the standpipe from a first position to a second position.

8. The filter housing of claim 7, wherein each of the resilient fingers includes an upper end and a protrusion at a base of the upper end, the upper ends flare outwardly away from the longitudinal axis of the standpipe and define the angled actuation surfaces, the protrusions project inwardly toward the longitudinal axis of the standpipe, and when the sleeve is at the first position the protrusions engage with a shoulder defined on the standpipe.

9. The filter housing of claim 7, wherein the flow control sleeve is moveable axially on the standpipe between a closed position and an open position, the standpipe opening is covered by the flow control sleeve when the flow control sleeve is at the closed position and the standpipe opening is not covered by the flow control sleeve when the flow control sleeve is at the open position, and when the fingers are deflected to the second position, movement of the flow control sleeve from the closed position to the open position is permitted.

10. The filter housing of claim 9, further including a spring that biases the flow control sleeve toward the closed position thereof.

11. The filter housing of claim 7, wherein the resilient fingers are disposed inside the flow control sleeve.

12. The filter housing of claim 7, wherein the resilient fingers extend upwardly from an end of the flow control sleeve.

13. The filter housing of claim 7, wherein the sleeve includes a body section and an upper end section coaxial with one another, the upper end section has a smaller diameter than the body section such that an annular shoulder is formed to connect the body section and the upper end section.

14. A filter assembly, comprising:
a filter housing including:
a housing body having a side wall and an end wall defining a filter cartridge space, the end wall forming a closed end of the filter cartridge space, and the body having an open end opposite the end wall;
a standpipe secured to the end wall and extending into the filter cartridge space from the closed end toward the open end, the standpipe including an internal flow passage, and at least one opening in the standpipe adjacent an upper end thereof that places the internal flow passage in communication with the filter cartridge space; and
a flow control sleeve disposed adjacent the upper end of the standpipe for controlling flow through the standpipe opening, the flow control sleeve includes a plurality of resilient fingers with angled actuation surfaces that face generally inward toward a longitudinal axis of the standpipe and generally upward toward the open end of the housing body, the fingers are deflectable radially outward away from the longitudinal axis of the standpipe from a first position to a second position; and
a filter cartridge disposed in the filter cartridge space, the filter cartridge including a ring of filter media, a first end cap, and a second end cap; the ring of filter media surrounding the standpipe and having a first end and a second end; the first end cap being secured to the first end of the filter media and having an opening through which the standpipe extends; the second end cap being secured to the second end of the filter media, the second end cap including a portion that projects within the ring of filter media and engages with the angled actuation surfaces of the resilient fingers to deflect the fingers radially outwardly to the second position.

15. The filter assembly of claim 14, wherein the flow control sleeve is moveable axially on the standpipe between a closed position and an open position, the standpipe opening is covered by the flow control sleeve when the flow control sleeve is at the closed position and the standpipe opening is not covered by the flow control sleeve when the flow control sleeve is at the open position, and when the fingers are deflected to the second position movement of the flow control sleeve from the closed position to the open position is permitted.

16. The filter assembly of claim 15, further including a spring that biases the sleeve toward the closed position.

17. The filter assembly of claim 14, wherein the resilient fingers are disposed within an interior of the flow control sleeve, and the projecting portion of the second end cap extends into the sleeve interior to deflect the resilient fingers.

18. The filter assembly of claim 14, wherein the resilient fingers are disposed at an end of the flow control sleeve, and the projecting portion of the second end cap surrounds a portion of the standpipe when the projection portion actuates the resilient fingers.

19. The filter assembly of claim 14, wherein the sleeve includes a body section and an upper end section coaxial with one another, the upper end section has a smaller diameter than the body section such that an annular shoulder is formed to connect the body section and the upper end section.

20. The filter assembly of claim 19, wherein each of the resilient fingers extends upwardly from the upper end section of the sleeve toward the second end cap, each of the resilient fingers includes an upper end and a protrusion at a base of the upper end, the upper ends flare outwardly away from the longitudinal axis of the standpipe and defines the actuation surface, the protrusions project inwardly toward the longitudinal axis of the standpipe, and when the sleeve is at the first position the protrusions engage with a shoulder defined on the standpipe.

21. The filter assembly of claim 20, wherein the projecting portion of the second end cap includes a projecting rim, the rim having an angled surface matching the angled actuation surfaces of the resilient fingers.

* * * * *